US012601785B2

(12) United States Patent　　　　(10) Patent No.: US 12,601,785 B2

Thekke Veetil et al.　　　　　　　(45) Date of Patent: Apr. 14, 2026

(54) PROVIDING CONFIGURABLE SECURITY FOR INTELLECTUAL PROPERTY CIRCUITS OF A PROCESSOR

(71) Applicant: Intel Corporation, Santa Clara, CA (US)

(72) Inventors: Ratheesh Thekke Veetil, Bangalore (IN); Gauri Shankar Singh, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 775 days.

(21) Appl. No.: 17/852,795

(22) Filed: Jun. 29, 2022

(65) Prior Publication Data

US 2024/0003973 A1　　Jan. 4, 2024

(51) Int. Cl.
| | |
|---|---|
| G01R 31/3185 | (2006.01) |
| G01R 31/317 | (2006.01) |
| G01R 31/3177 | (2006.01) |
| G06F 11/30 | (2006.01) |
| G06F 21/62 | (2013.01) |

(52) U.S. Cl.
CPC ................ G01R 31/318588 (2013.01); G01R 31/31705 (2013.01); G01R 31/31726 (2013.01); G06F 11/3089 (2013.01); G06F 21/62 (2013.01); *G01R 31/3177* (2013.01); *G01R 31/318547* (2013.01)

(58) Field of Classification Search
CPC ...... G01R 31/318588; G01R 31/31705; G01R 31/31726; G01R 31/3177; G01R 31/318547; G06F 11/3089; G06F 21/62

USPC .......................................................... 714/719
See application file for complete search history.

(56) References Cited

U.S. PATENT DOCUMENTS

| | | | | |
|---|---|---|---|---|
| 7,117,352 B1 * | 10/2006 | Giles | ................ | G01R 31/31719 |
| | | | | 713/2 |
| 2008/0082879 A1 * | 4/2008 | Guettaf | .......... | G01R 31/318563 |
| | | | | 714/727 |
| 2009/0257594 A1 * | 10/2009 | Qureshi | ................ | H04L 9/0631 |
| | | | | 380/277 |
| 2016/0179646 A1 * | 6/2016 | Neve De Mevergnies | ................ | |
| | | | | G06F 11/27 |
| | | | | 714/30 |
| 2018/0059184 A1 * | 3/2018 | Deng | ............. | G01R 31/318588 |
| 2020/0019734 A1 * | 1/2020 | Raja Gopal | ........... | H04L 9/0631 |
| 2020/0348361 A1 * | 11/2020 | Kurts | ................... | G06F 21/606 |

OTHER PUBLICATIONS

XJTAG, "Technical Guide to JTAG," https://www.xjtag.com/about-jtag/jtag-a-technical-overview/, 2022, pp. 1-8.

* cited by examiner

*Primary Examiner* — James C Kerveros

(74) *Attorney, Agent, or Firm* — Nicholson De Vos Webster & Elliott LLP

(57) ABSTRACT

In one embodiment, a method includes: receiving, in a replica circuit associated with a first intellectual property (IP) circuit of a system on chip (SoC), a security policy; receiving, in the replica circuit, a test data register access message to identify an access to a first test data register of the first IP circuit; and preventing the access to the first test data register based at least in part on the security policy. Other embodiments are described and claimed.

18 Claims, 13 Drawing Sheets

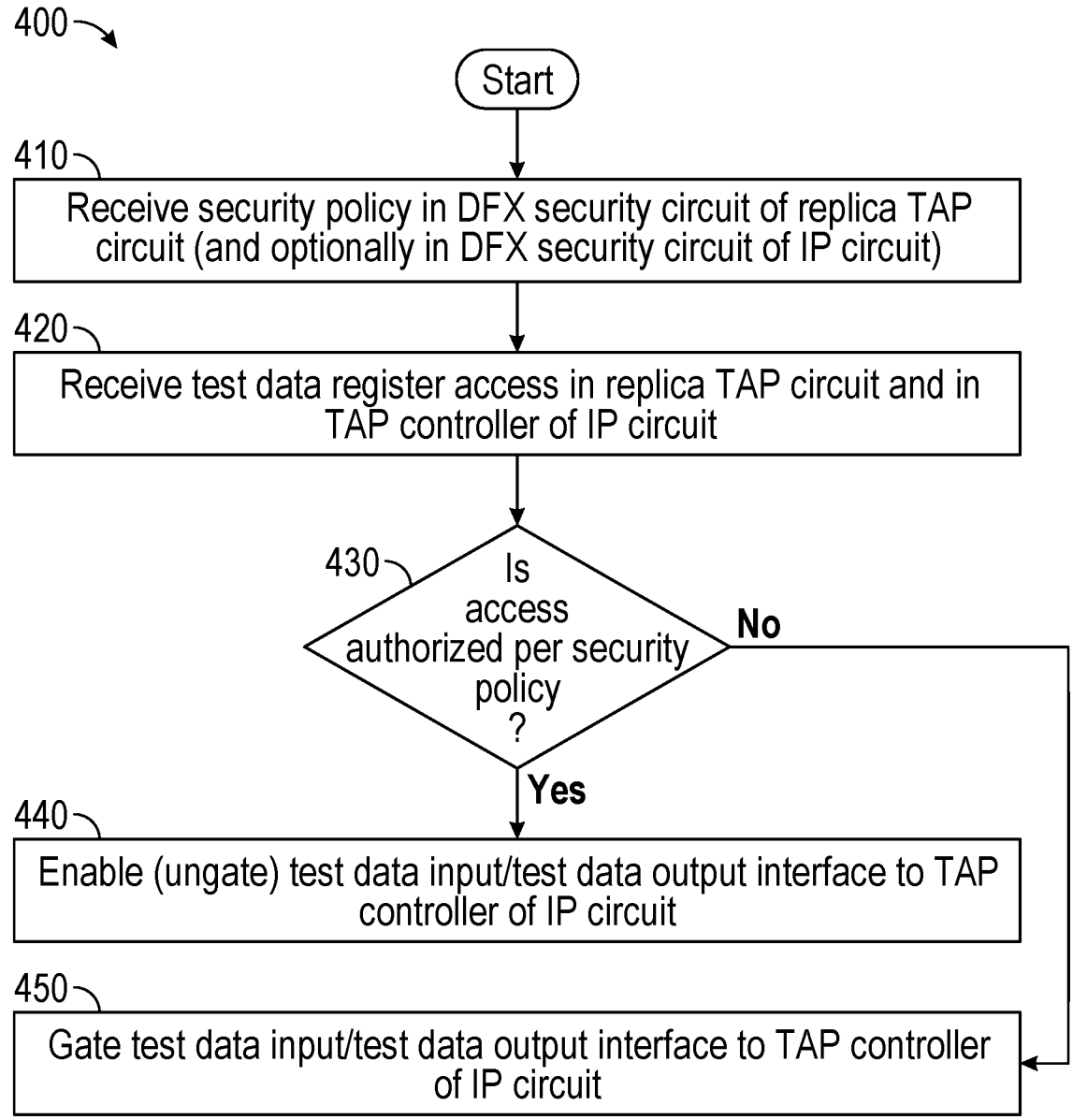

400

Start

410
Receive security policy in DFX security circuit of replica TAP circuit (and optionally in DFX security circuit of IP circuit)

420
Receive test data register access in replica TAP circuit and in TAP controller of IP circuit 430
Is access authorized per security policy ?

No

Yes

440
Enable (ungate) test data input/test data output interface to TAP controller of IP circuit 450
Gate test data input/test data output interface to TAP controller of IP circuit

FIG. 4

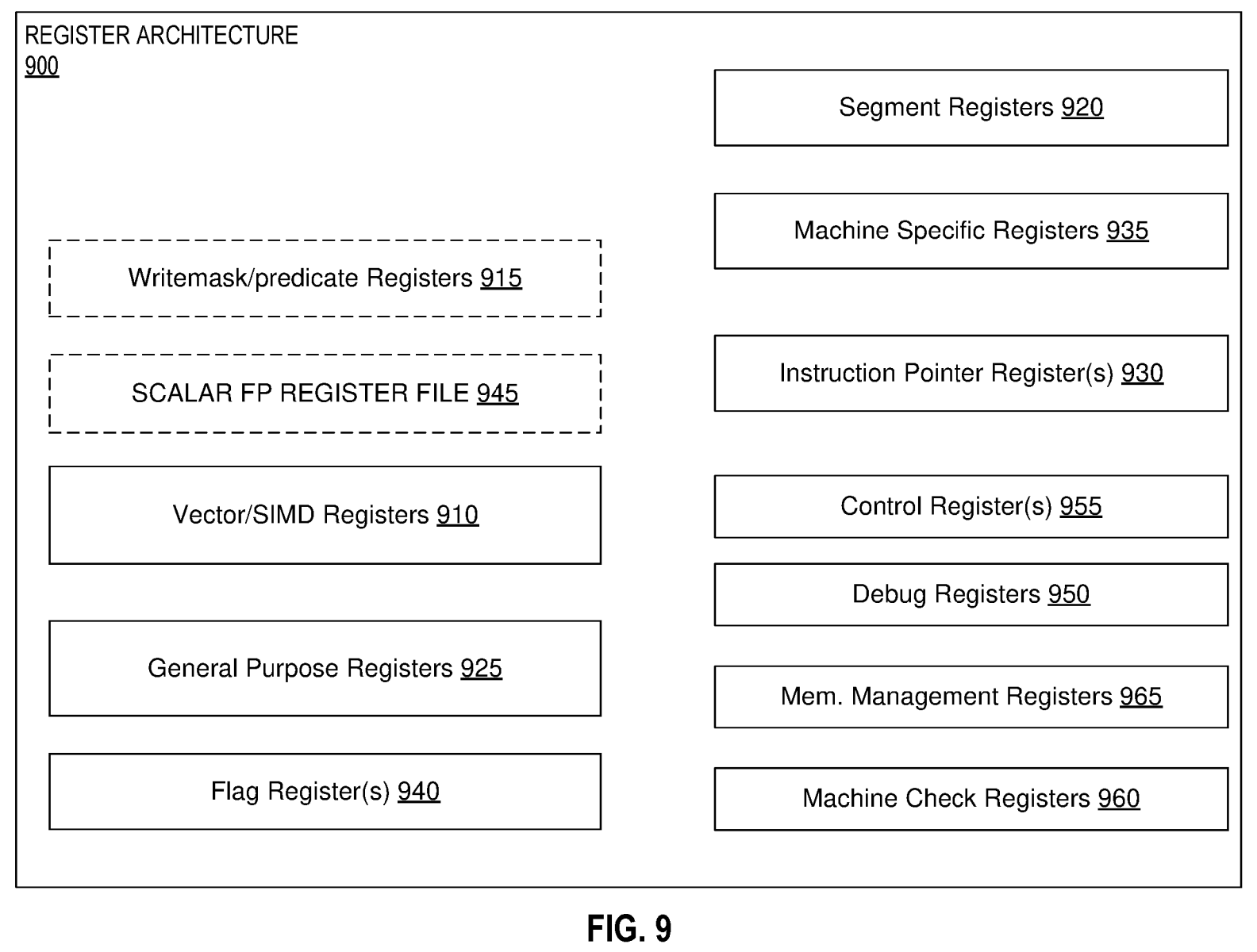

REGISTER ARCHITECTURE
900

Writemask/predicate Registers 915

SCALAR FP REGISTER FILE 945

Vector/SIMD Registers 910

General Purpose Registers 925

Flag Register(s) 940

Segment Registers 920

Machine Specific Registers 935

Instruction Pointer Register(s) 930

Control Register(s) 955

Debug Registers 950

Mem. Management Registers 965

Machine Check Registers 960

FIG. 9

PROVIDING CONFIGURABLE SECURITY FOR INTELLECTUAL PROPERTY CIRCUITS OF A PROCESSOR

BACKGROUND

System on Chips (SoCs) are built using multiple Soft Intellectual Property (SoftIP or SIP) circuits and Hard Intellectual Property (Hard-IP or HIP) circuits, many of which are supplied by third party vendors. To incorporate a stable and proven version of such IP circuits, the IP circuits typically are developed independently of the SoC and often much ahead of the SoC design cycle. Undesired development costs and time is incurred if a modification is needed for an already developed IP circuit.

In addition to functional features, IP circuits have Design For Test/Debug (DFX) features to support test, debug and survivability. These DFX features are typically enabled by Test Data Registers (TDR) that are controlled via a Joint Test Action Group (JTAG) interface in accordance with an Institute of Electrical and Electronics Engineers (IEEE) 1149.1 standard, such as the IEEE 1149.1-2013 standard for Test Access Port (TAP) and Boundary-Scan Architecture (BSA). There may be different security requirements with respect to unauthorized access to TDRs (e.g., read or write accesses) depending on SoC specifications. Current techniques do not provide suitable configurability as to DFX feature security without IP modification.

BRIEF DESCRIPTION OF THE DRAWINGS

FIG. 4 is a flow diagram of a method in accordance with an embodiment.

FIG. 9 is a block diagram of a register architecture according to some examples.

DETAILED DESCRIPTION

In various embodiments, DFX security definitions for a product such as an SoC can be implemented at the SoC level (outside any internal HIP), without incurring any HIP design change or development cycle involvement. In one or more embodiments, a replica TAP circuit is provided in association with each IP circuit having DFX circuitry for which configurable DFX security is desired. Such replica TAP circuitry may be provided at the SoC level, and may be configured to mimic an HIP's internal JTAG Test Access Port (TAP) controller and instruction register (IR) decoder.

Any product (e.g., SoC-level) security policy is provided to the replica TAP circuit, based at least in part on which at least one security gating signal may be generated. Such security gating signal(s) may be used to gate Test Data Input (TDI) and Test Data Output (TDO) of a HIP's JTAG interface during a shift Data Register (DR) JTAG finite state machine (FSM) state, if unauthorized access of a secure TDR for read or write is detected. In one or more embodiments, the replica TAP circuit and a TAP circuit of an associated IP circuit are placed in the same JTAG FSM state during execution. This arrangement also ensures continuous monitoring of unauthorized access attempts to read/write an IP circuit's TDRs. In one or more embodiments, the replica TAP circuit may be configured to be invisible to any external JTAG access (at product level or SoC level).

In terms of DFX security, a HIP can be broadly classified as: (1) not having DFX security, in which all test/debug/survivability features are accessible without any security unlock, and thus one cannot have different levels of security for different TDRs (or test/debug features) of the HIP; and (2) granular DFX security, in which different flavors of security are provided to different TDRs for test/debug/survivability enablement.

Without the technology disclosed herein, once HIP development is completed, the security of each TDR in the HIP cannot be modified without opening the HIP's development cycle. Instead with the technology disclosed herein, in both classes of DFX security, an SoC security policy can be used to provide and/or override DFX security for an IP circuit.

Different product lines (e.g., SoCs) come with varied security requirements including DFX security requirements to meet certain specifications. With embodiments, IP circuits that do not have a security feature (or, if present, a different security requirement) can be provided with DFX security when implemented into a given product without additional IP development cycle, enabling a shorter time to market, lower cost of development, and less complexity. Embodiments further enable security requirement tuning during the product development cycle.

Figure 1:
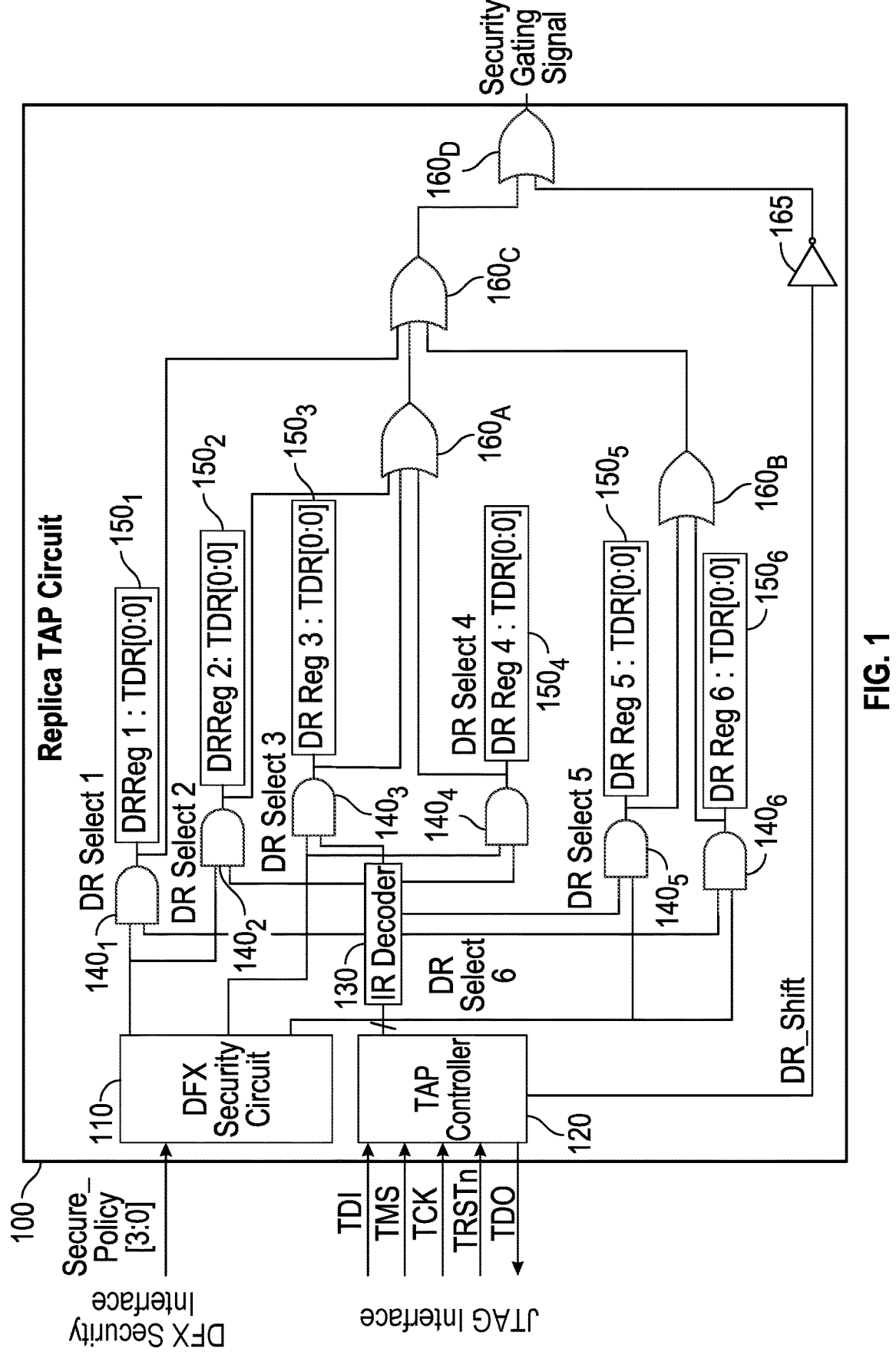
FIG. 1 is a schematic diagram of a replica TAP circuit in accordance with an embodiment.

Referring now to FIG. 1, shown is a schematic diagram of a replica TAP circuit in accordance with an embodiment. More specifically as shown in FIG. 1, replica TAP circuit 100 may be one of multiple replica TAP circuits each associated with a given HIP. Replica TAP circuit 100 may be specially configured to be structurally similar to TAP and DFX circuitry as present in a given HIP.

As shown in FIG. 1, replica TAP circuit 100 includes a DFX security circuit 110, which receives incoming security policy information (Secure_policy [3:0]). In an embodiment, such security policy information may be received from a security policy generator of an SoC (where the SoC includes TAP circuit 100 and the HIP). In an embodiment, DFX security circuit 110 may include decoder or other processing logic to identify, based on the security policy information, whether accesses to particular TDRs are allowed.

Still with reference to FIG. 1, replica TAP circuit 100 also includes a TAP controller 120. In one or more embodiments, TAP controller 120 may be an IEEE JTAG 1149.1 TAP controller, which may be implemented as a finite state machine (FSM). As seen, via a JTAG interface, various signals for use in DFX operations may be communicated with TAP controller 120. Such signaling includes test data input (TDI), test mode signal (TMS), a test clock (TCK), a test reset signal (TRSTn) and test data output (TDO). Of course it is possible for other test signals and DFX circuitry to be present in other embodiments.

When an incoming TDR access command is received, it is provided from TAP controller 120 to an instruction register (IR) decoder 130 which may decode the command to identify a destination, namely a target TDR. Based upon decoding performed in IR decoder 130, a given data register (DR) select signal may be provided as a first input signal to one of multiple gating circuits 1401-1406 which, in the embodiment of FIG. 1, are implemented as AND gates. As shown, a second input signal into each gating circuit 140 may be received from DFX security circuit 110. When at a logic high level, this control output signal from DFX security circuit 110 indicates that an access to a corresponding TDR is allowed. Conversely, when at a logic low level, this control output signal indicates that an access to a corresponding TDR is to be prevented. In this way, gating circuit 140 acts as a gating circuit that is used to gate a select signal output by IR decoder 130.

Note that while in FIG. 1, replica TAP circuit 100 is further shown to include a plurality of TDRs $150_1$-$150_6$, in a given implementation the actual test data registers may not be present. Instead, to enable operation as a replica (or so-called snooper) TAP circuit, matching addressing of TDRs present in the HIP is all that is needed here. As illustrated, the logic output signals of gating circuits 140 are provided to a selected one of additional gating circuits $160_{A-C}$, which are implemented as OR gates. Each OR gate 160 may collect the outputs of multiple gating circuits 140, and provide an output signal as an input to another gating circuit 160, namely another OR gate that further receives an inverted version (via inverter 165) of a data register shift (DR shift) signal received from TAP controller 120. As such, the resulting output of logic gate 160D is a security gating signal to gate or ungate communication of TDO/TDI signals for a HIP that is associated with replica TAP circuit 100.

In one or more embodiments, a replica TAP circuit may have the following design properties: an equal number of TDRs as present in the HIP (width could be different, or even removed, so long as the same register addressing is maintained); the same IR opcode assignments as of the HIP TAP controller; adapted to maintain the FSM state of the replica TAP controller and the HIP TAP controller to be always in the same state; and configured to generate at least one security gating signal to control access to TDRs. While shown at this high level in the embodiment of FIG. 1, many variations and alternatives are possible.

Figure 2:
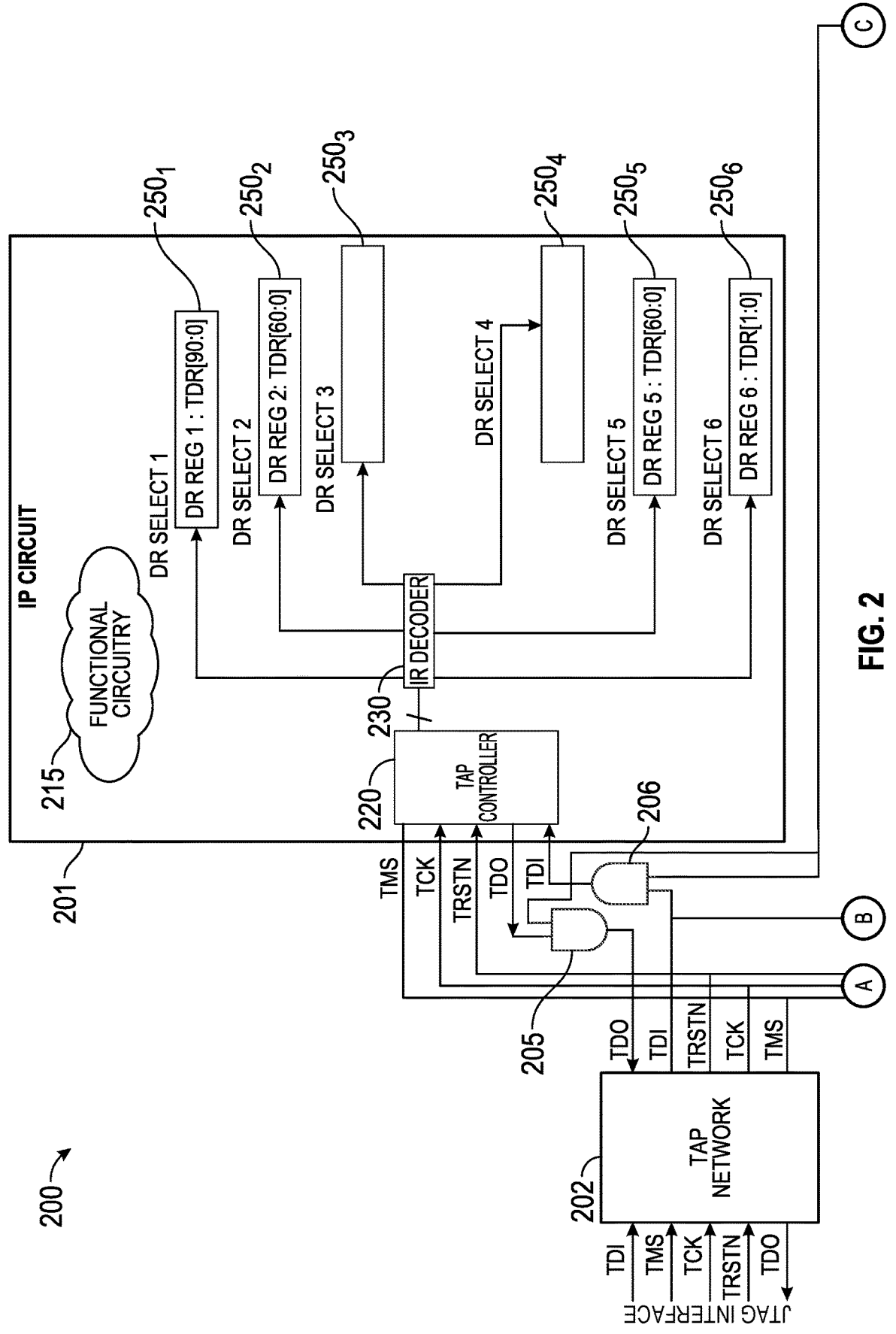
FIG. 2 is a schematic diagram of an SoC in accordance with an embodiment.
Figure 2:
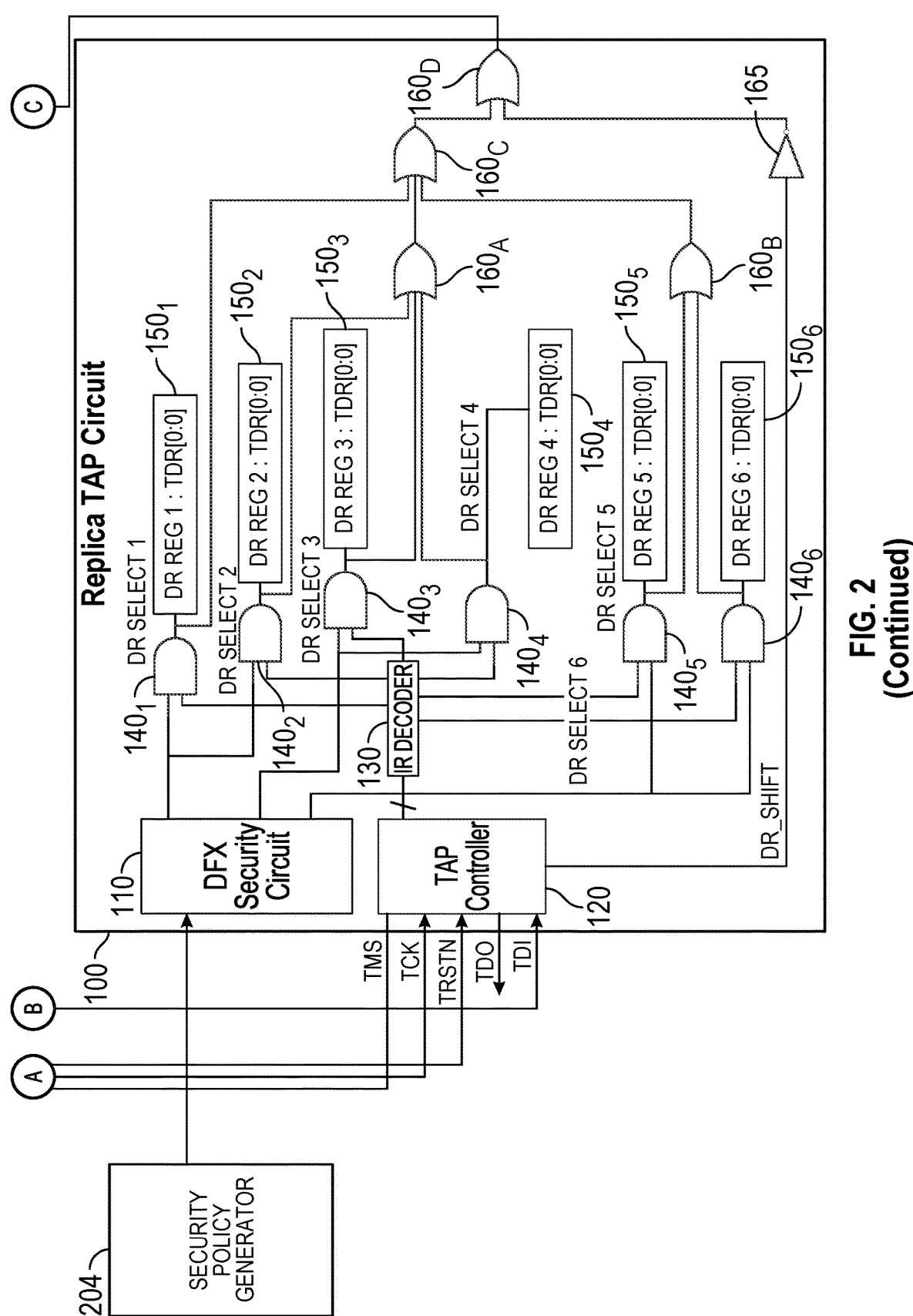

Referring now to FIG. 2, shown is a schematic diagram of an SoC illustrating an association between a replica TAP circuit and an IP circuit including TAP circuitry and additional DFX circuitry. More specifically as shown in FIG. 2, an SoC 200 may include replica TAP circuitry 100 that may be implemented as described above in FIG. 1 (and thus the same numbering convention is used here).

Additional components of SoC 200 are illustrated, including a TAP network 202. In embodiments, TAP network 202 may be implemented as an SoC-wide DFX control circuit. In one or more embodiments TAP network 202 may be implemented as a hierarchical TAP endpoint. TAP network 202 is coupled to a JTAG interface to receive various JTAG signals including those discussed above. In turn, TAP network 202 couples to TAP controller 120 of replica TAP circuit 100 and also couples to a TAP circuit 220 of an IP circuit 201. During SoC development, these two TAP controllers may be configured to be connected in a manner to receive the same JTAG signal in parallel. This ensures that both the TAP FSMs are always exactly in the same state. To this end, replica TAP circuit 100 and IP circuit 201 may or may not be located in a same general region of a layout.

In various embodiments, IP circuit 201 may be any type of HIP such as a general-purpose processing core, specialized IP circuit, fixed function unit, graphics processor (e.g., including one or more graphics processing units (GPUs)), among many other types of HIPs. In one or more embodiments, IP circuit 201 may be a HIP that is provided by a third party to the manufacturer of SoC 200. Note that in the implementation of FIG. 2, IP circuit 201 does not include any internal DFX security circuitry. Without an embodiment, access to TDRs 2501-6 would be unrestricted, and thus may be subject to compromise or attack.

As illustrated, IP circuit 200 includes functional circuitry 215, which may be any type of functional circuitry, such as the cores, GPUs, fixed function units, or so forth described above. In other aspects, the DFX circuitry of IP circuit 201 may be implemented similarly as within replica TAP circuit 100. Thus at a high level such components include a TAP controller 220, IR decoder 230 and TDRs 2501-6. Note however that there is no gating circuitry or DFX security circuitry such as present in replica TAP circuit 100.

With this arrangement, IP circuit 201 without any DFX security circuitry/functionality can be implemented as is into SoC 200 when it has a product requirement to have only certain test or debug features accessible by a customer or other entity external to the SoC manufacturer. In such case, assume the security policy of the SoC is to permit one or a limited number of TDRs to be readable/writable without any security unlocking, while a remainder of the TDRs locked to be accessible only after a proper security unlock.

As one example of overriding a default security policy associated with an IP circuit, consider the following scenario. Assume for a given SoC, rather than allowing unsecured access to all TDRs, the SoC security policy dictates: DR Reg 1 to GREEN security level (no security unlocks needed); DR Regs 2-4 to ORANGE security level (e.g., a first security level); and DR Regs 5-6 to RED security level (e.g., a second, higher security level).

With this scenario, replica TAP circuit 100 may be configured to generate at least one security gating signal to control access to the TDRs, which will be Logic "0" (to gate the access) when a TAP controller is in a JTAG FSM "DR SHIFT" state if an unauthorized access is detected (e.g., any DR access attempted without corresponding security unlock such as when a RED TDR is to be accessed with an ORANGE security unlock, or an ORANGE TDR is to be accessed with a GREEN security unlock), and is Logic "1" (to ungate the access) in all other cases. In an embodiment, this security gating signal may be used to gate the "TDI" and "TDO" signals in a JTAG interface. With reference to FIG. 2, replica TAP circuit 100 generates this security gating signal to gate the TDI/TDO interface of IP circuit 201. Note that the TDO interface of replica TAP circuit 100 is not used and may be left unconnected, in an embodiment. To effect this gating and ungating of signals into/out of the JTAG interface, a pair of gating circuits, namely AND gates 205, 206 are present, to gate TDI/TDO signals with the security gating signal generated in replica TAG circuit 100.

While shown at this high level in the embodiment of FIG. 2, many variations and alternatives are possible. Also note that the illustration in FIG. 2 is of but a portion of an overall SoC design. In one or more embodiments, a replica TAP circuit may be associated with every IP circuit present on the SoC (or at least for such IP circuits for which configurable security may be desired). Or there can be single SoC-wide replica TAP circuit that can be associated with an IP circuit undergoing DFX operations. Also in a particular SoC, there may be additional circuitry present, including memories, interface circuitry, interconnection networks, memory controllers and so forth.

In other implementations, a replica TAP circuit may be associated with an IP circuit that has internal DFX security circuitry. With such arrangement, a pre-configured security policy for the IP circuit may be overridden by an SoC-level security policy. For example, assume that a third party IP circuit is provided with a set of TDRs, where at least some of the TDRs may have different security levels (e.g., unsecured, a lower level of security and a higher level of security). With an embodiment, a security policy that is provided by the SoC to replica TAP circuitry may cause TDI/TDO signals to be gated for at least access to one or more of the TDRs of the third party IP circuit in a different manner than specified by the third party IP designer.

Figure 3:
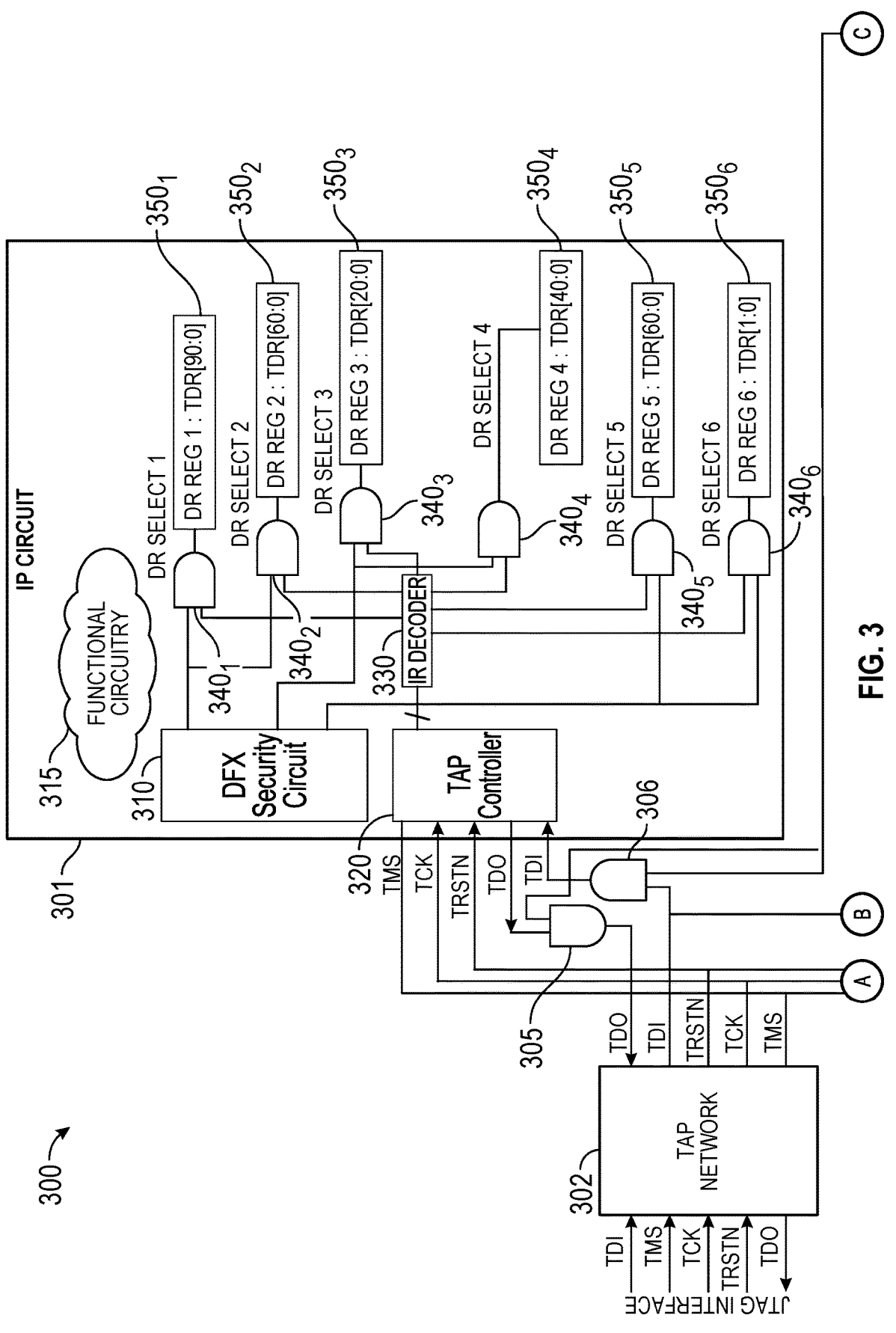
FIG. 3 is a schematic diagram of an SoC in accordance with another embodiment.
Figure 3:
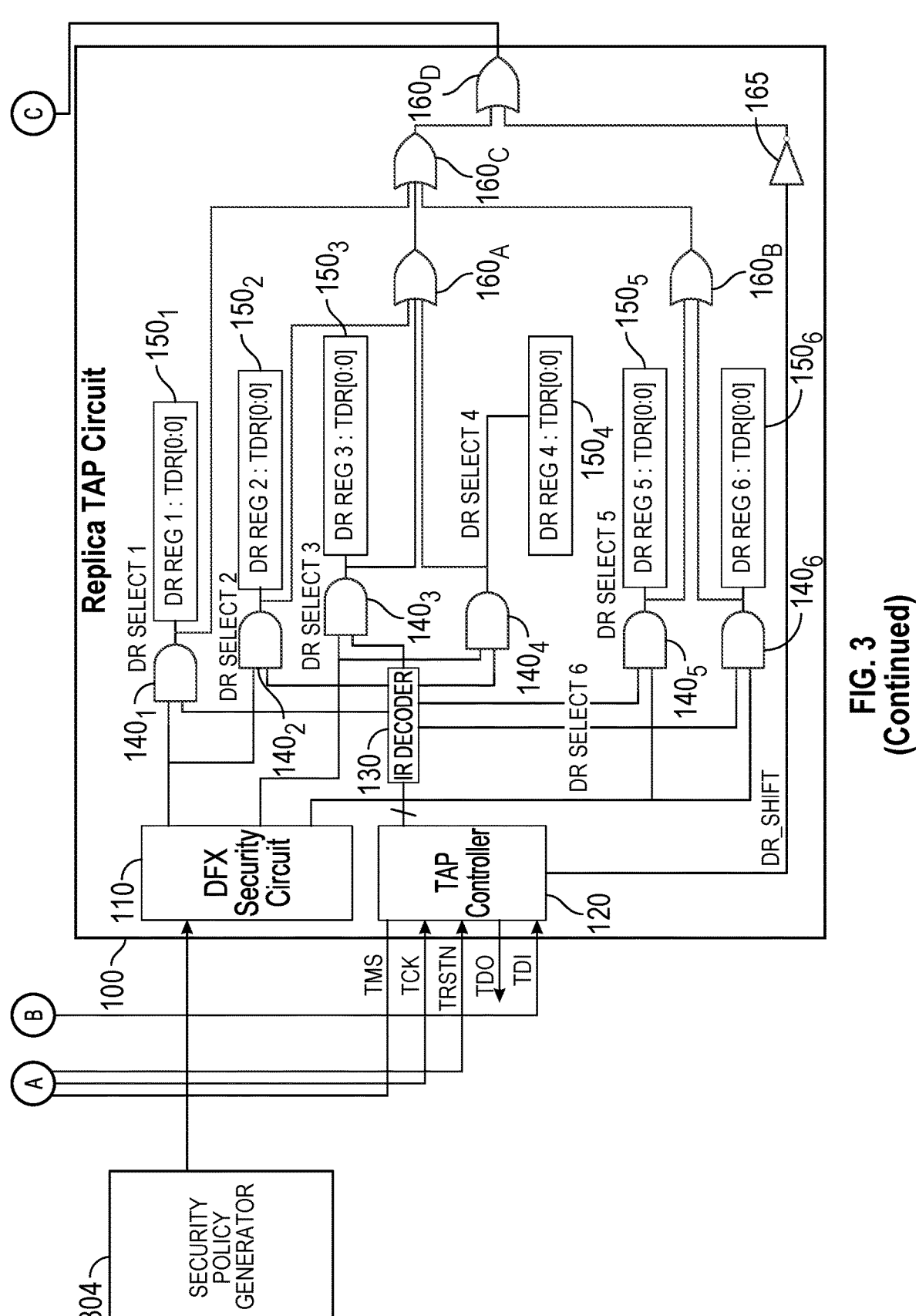

Referring now to FIG. 3, shown is a schematic diagram of an SoC illustrating an association between a replica TAP circuit and an IP circuit including TAP circuitry, a DFX security circuit, and additional DFX circuitry. More specifically as shown in FIG. 3, an SoC 300 may include replica TAP circuitry 100 that may be implemented as described above in FIG. 1 (and thus the same numbering convention is used here). In FIG. 3, SoC 300 may be implemented substantially similarly to SoC 200 of FIG. 2 (and thus the same numbering convention is used, although here of the "300" series). However in this implementation, IP circuit 301 includes internal DFX security circuitry, including a DFX security circuit 310 and gating circuitry $340_1$-$340_6$.

With this arrangement, IP circuit 301 as designed may have DFX circuitry including TDRs having some basic/ generic security gating. As one example, assume one or a few TDRs can be accessible without any security unlock (GREEN), while a remainder of the TDRs may be locked to be accessible after some level of security unlocking (ORANGE, RED, etc.). Note that this pre-implemented security of the TDRs may not be in line with a product requirement. With an embodiment, a level of security of the TDRs may be modified by overriding this default security policy with an SoC security policy. In this case, when IP circuit 301 is implemented into SoC 300, its default security may be bypassed by tying the interface or in another manner.

As shown in FIG. 3, a DR shift access through the TDI port of IP circuit 301 is ungated only when the selected DR has the correct level of security unlock. Since both IR decoders (inside replica TAP circuit 100 and TAP controller 320) are decoded at the same time for the same value, this TDR (DR reg) only receives data through TDI when both DR select and corresponding secure unlock happens. Since there is no gating on any of the other JTAG signals (TCK, TMS or TRSTn) to IP circuit 301, FSMs of both replica TAP circuit 100 and TAP controller 320 always remain in synchronization, ensuring that any subsequent IR select of both circuits are in alignment.

Referring now to FIG. 4, shown is a flow diagram of a method in accordance with an embodiment. As shown in FIG. 4, method 400 is a method for performing security operations for DFX circuitry within an SoC. As such, method 400 may be performed by hardware circuitry present in the SoC, including replica TAP circuitry, TAP circuitry included in an associated IP circuit, and potentially additional DFX security circuitry of the IP circuit alone, and/or in combination with firmware and/or software.

As illustrated, method 400 begins by receiving a security policy in a DFX security circuit of a replica TAP circuit (block 410). In an embodiment, the security policy may be received from a security policy generator of the SoC. Depending upon implementation of the IP circuit, the security policy also may be provided to a DFX security circuit of the IP circuit, if present.

Still with reference to FIG. 4, control next passes to block 420 where a test data register access may be received in both the replica TAP circuit (e.g., a TAP controller of the replica TAP circuit) and a TAP controller of the IP circuit. Assume for purposes of discussion that this data register access is one of a read or write access to a given TDR of the IP circuit (where this TDR is associated with certain DFX circuitry). Control next passes to diamond 430 to determine whether this access is authorized per the security policy. In an embodiment, the replica TAP circuit includes gating circuitry as discussed above, which may generate security gating signals that, in turn, are provided to additional gating circuitry that couples to the TDO/TDI interface to the IP circuit (and more specifically to the TAP controller of the IP circuit).

If the access is authorized according to the security policy, control passes to block 440. At block 440, the TDI/TDO interface may be enabled (ungated), thus allowing TDI/TDO information to be communicated between the TAP controller of the IP circuit and, e.g., a TAP network during a DR state shift in a JTAG FSM of the TAP controller. To this end, the replica TAP circuit may output a logic high security gating signal that enables this additional gating circuitry of the SoC to allow the TDO/TDI signals to be communicated with the IP circuit. In contrast, if the access is not authorized according to the security policy, control instead passes to block 450 where the TDI/TDO interface to the TAP controller of the IP circuit may be gated during the DR shift state in a JTAG interface of the TAP controller. While shown at this high level in the embodiment of FIG. 4, many variations and alternatives are possible.

With one or more embodiments, all DFX security requirements of a product can be met with certainty. Such implementation can be used for any HIP that comes with or without DFX security. At the same time, there is no modification of the HIP needed to meet product DFX security requirements. By using a replica TAP circuit in accordance with an embodiment, a SoC development can save significant cost by reusing HIPs (especially, third party HIPs). Still further a HIP design team need not develop and maintain multiple versions for resolving security differences.

Figure 5:
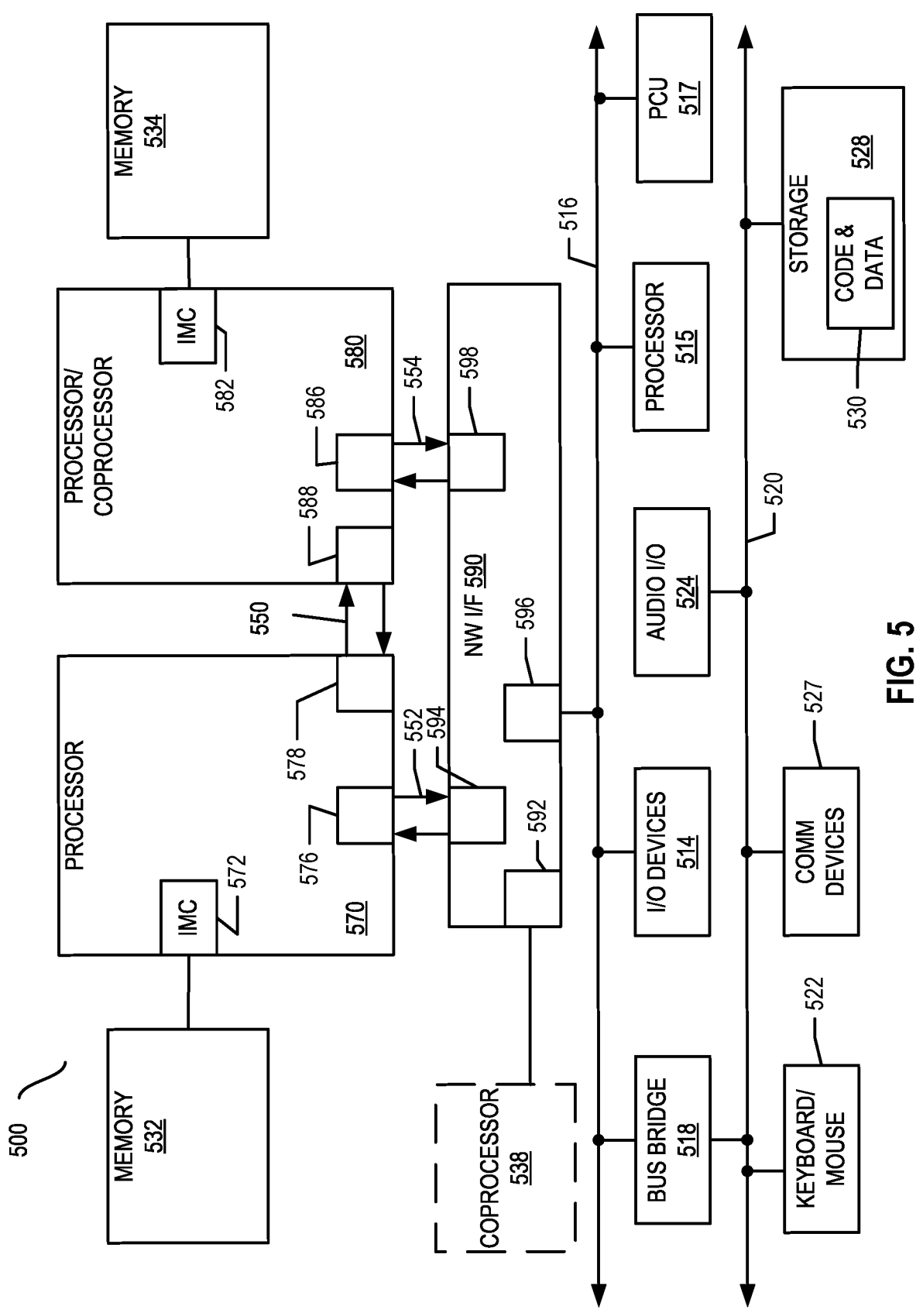
FIG. 5 illustrates an example computing system.

FIG. 5 illustrates an example computing system. Multiprocessor system 500 is an interfaced system and includes a plurality of processors or cores including a first processor 570 and a second processor 580 coupled via an interface 550 such as a point-to-point (P-P) interconnect, a fabric, and/or bus. In some examples, the first processor 570 and the second processor 580 are homogeneous. In some examples, first processor 570 and the second processor 580 are heterogenous. Though the example system 500 is shown to have two processors, the system may have three or more processors, or may be a single processor system. In some examples, the computing system is a system on a chip (SoC).

Processors 570 and 580 are shown including integrated memory controller (IMC) circuitry 572 and 582, respectively. Processor 570 also includes interface circuits 576 and 578; similarly, second processor 580 includes interface circuits 586 and 588. Processors 570, 580 may exchange information via the interface 550 using interface circuits 578, 588. IMCs 572 and 582 couple the processors 570, 580 to respective memories, namely a memory 532 and a memory 534, which may be portions of main memory locally attached to the respective processors. Processors 570, 580 also may include, internal to cores or other processing engines, DFX circuitry as described herein, which may have certain operations gated using replica TAP circuitry also included in processors 570, 580.

Processors 570, 580 may each exchange information with a network interface (NW I/F) 590 via individual interfaces 552, 554 using interface circuits 576, 594, 586, 598. The network interface 590 (e.g., one or more of an interconnect, bus, and/or fabric, and in some examples is a chipset) may optionally exchange information with a coprocessor 538 via an interface circuit 592. In some examples, the coprocessor 538 is a special-purpose processor, such as, for example, a high-throughput processor, a network or communication processor, compression engine, graphics processor, general purpose graphics processing unit (GPGPU), neural-network processing unit (NPU), embedded processor, or the like.

A shared cache (not shown) may be included in either processor 570, 580 or outside of both processors, yet connected with the processors via an interface such as P-P interconnect, such that either or both processors' local cache information may be stored in the shared cache if a processor is placed into a low power mode.

Network interface 590 may be coupled to a first interface 516 via interface circuit 596. In some examples, first interface 516 may be an interface such as a Peripheral Component Interconnect (PCI) interconnect, a PCI Express interconnect or another I/O interconnect. In some examples, first interface 516 is coupled to a power control unit (PCU) 517, which may include circuitry, software, and/or firmware to perform power management operations with regard to the processors 570, 580 and/or co-processor 538. PCU 517 provides control information to a voltage regulator (not shown) to cause the voltage regulator to generate the appropriate regulated voltage. PCU 517 also provides control information to control the operating voltage generated. In various examples, PCU 517 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 517 is illustrated as being present as logic separate from the processor 570 and/or processor 580. In other cases, PCU 517 may execute on a given one or more of cores (not shown) of processor 570 or 580. In some cases, PCU 517 may be implemented as a microcontroller (dedicated or general-purpose) or other control logic configured to execute its own dedicated power management code, sometimes referred to as P-code. In yet other examples, power management operations to be performed by PCU 517 may be implemented externally to a processor, such as by way of a separate power management integrated circuit (PMIC) or another component external to the processor. In yet other examples, power management operations to be performed by PCU 517 may be implemented within BIOS or other system software.

Various I/O devices 514 may be coupled to first interface 516, along with a bus bridge 518 which couples first interface 516 to a second interface 520. In some examples, one or more additional processor(s) 515, such as coprocessors, high throughput many integrated core (MIC) processors, GPGPUs, accelerators (such as graphics accelerators or digital signal processing (DSP) units), field programmable gate arrays (FPGAs), or any other processor, are coupled to first interface 516. In some examples, second interface 520 may be a low pin count (LPC) interface. Various devices may be coupled to second interface 520 including, for example, a keyboard and/or mouse 522, communication devices 527 and storage circuitry 528. Storage circuitry 528 may be one or more non-transitory machine-readable storage media as described below, such as a disk drive or other mass storage device which may include instructions/code and data 530. Further, an audio I/O 524 may be coupled to second interface 520. Note that other architectures than the point-to-point architecture described above are possible. For example, instead of the point-to-point architecture, a system such as multiprocessor system 500 may implement a multi-drop interface or other such architecture.

Example Core Architectures, Processors, and Computer Architectures

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may be included on the same die as the described CPU (sometimes referred to as the application core(s) or application processor(s)), the above described coprocessor, and additional functionality. Example core architectures are described next, followed by descriptions of example processors and computer architectures.

Figure 6:
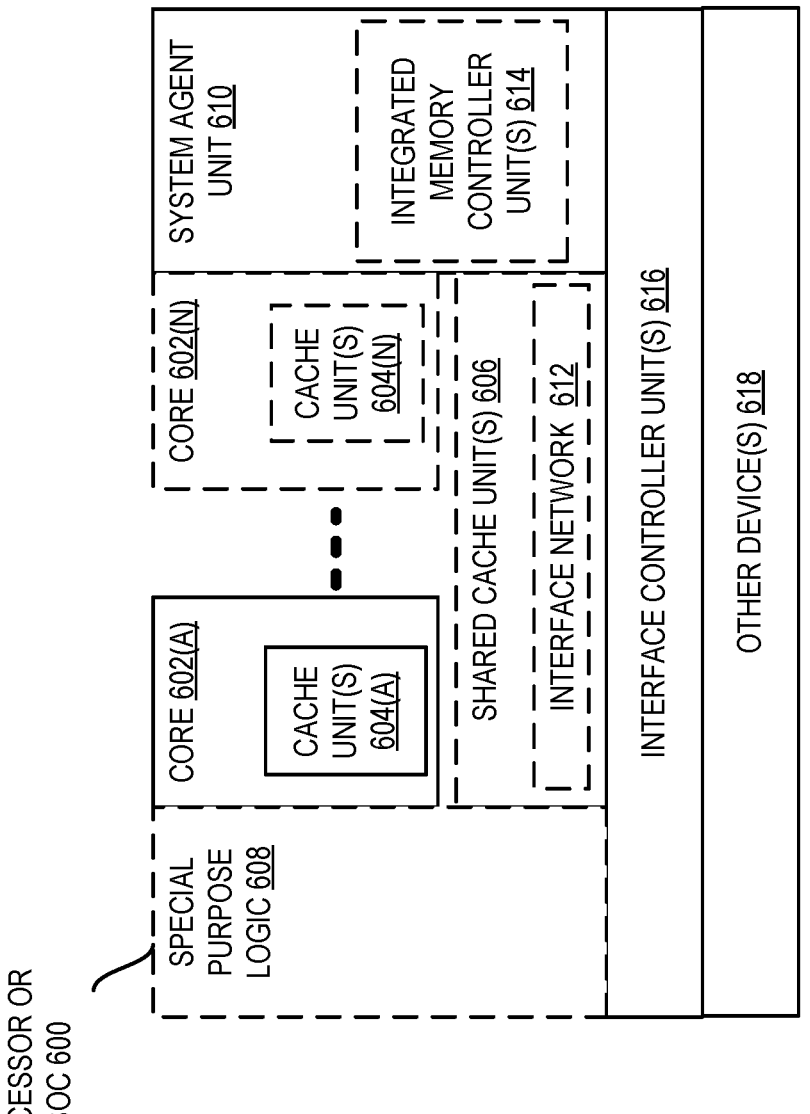
FIG. 6 illustrates a block diagram of an example processor and/or System on a Chip (SoC) that may have one or more cores and an integrated memory controller.

FIG. 6 illustrates a block diagram of an example processor and/or SoC 600 that may have one or more cores and an integrated memory controller. The solid lined boxes illustrate a processor 600 with a single core 602(A), system agent unit circuitry 610, and a set of one or more interface controller unit(s) circuitry 616, while the optional addition of the dashed lined boxes illustrates an alternative processor 600 with multiple cores 602(A)-(N), a set of one or more integrated memory controller unit(s) circuitry 614 in the system agent unit circuitry 610, and special purpose logic 608, as well as a set of one or more interface controller units circuitry 616. Note that the processor 600 may be one of the processors 570 or 580, or co-processor 538 or 515 of FIG. 5.

Thus, different implementations of the processor 600 may include: 1) a CPU with the special purpose logic 608 being integrated graphics and/or scientific (throughput) logic (which may include one or more cores, not shown), and the cores 602(A)-(N) being one or more general purpose cores (e.g., general purpose in-order cores, general purpose out-of-order cores, or a combination of the two); 2) a coprocessor with the cores 602(A)-(N) being a large number of special purpose cores intended primarily for graphics and/or scientific (throughput); and 3) a coprocessor with the cores 602(A)-(N) being a large number of general purpose in-order cores. Thus, the processor 600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 600 may be a part of and/or may be implemented on one or more substrates using any of a number of process technologies, such as, for example, complementary metal oxide semiconductor (CMOS), bipolar CMOS (BiCMOS), P-type metal oxide semiconductor (PMOS), or N-type metal oxide semiconductor (NMOS).

A memory hierarchy includes one or more levels of cache unit(s) circuitry 604(A)-(N) within the cores 602(A)-(N), a set of one or more shared cache unit(s) circuitry 606, and external memory (not shown) coupled to the set of integrated memory controller unit(s) circuitry 614. The set of one or more shared cache unit(s) circuitry 606 may include one or more mid-level caches, such as level 2 (L2), level 3 (L3), level 4 (L4), or other levels of cache, such as a last level cache (LLC), and/or combinations thereof. While in some examples interface network circuitry 612 (e.g., a ring interconnect) interfaces the special purpose logic 608 (e.g., integrated graphics logic), the set of shared cache unit(s) circuitry 606, and the system agent unit circuitry 610, alternative examples use any number of well-known techniques for interfacing such units. In some examples, coherency is maintained between one or more of the shared cache unit(s) circuitry 606 and cores 602(A)-(N). In some examples, interface controller units circuitry 616 couple the cores 602 to one or more other devices 618 such as one or more I/O devices, storage, one or more communication devices (e.g., wireless networking, wired networking, etc.), etc.

In some examples, one or more of the cores 602(A)-(N) are capable of multi-threading. The system agent unit circuitry 610 includes those components coordinating and operating cores 602(A)-(N). The system agent unit circuitry 610 may include, for example, power control unit (PCU) circuitry and/or display unit circuitry (not shown). The PCU may be or may include logic and components needed for regulating the power state of the cores 602(A)-(N) and/or the special purpose logic 608 (e.g., integrated graphics logic). The display unit circuitry is for driving one or more externally connected displays.

The cores 602(A)-(N) may be homogenous in terms of instruction set architecture (ISA). Alternatively, the cores 602(A)-(N) may be heterogeneous in terms of ISA; that is, a subset of the cores 602(A)-(N) may be capable of executing an ISA, while other cores may be capable of executing only a subset of that ISA or another ISA.

Example Core Architectures—In-Order and Out-of-Order Core Block Diagram

Figure 7A:
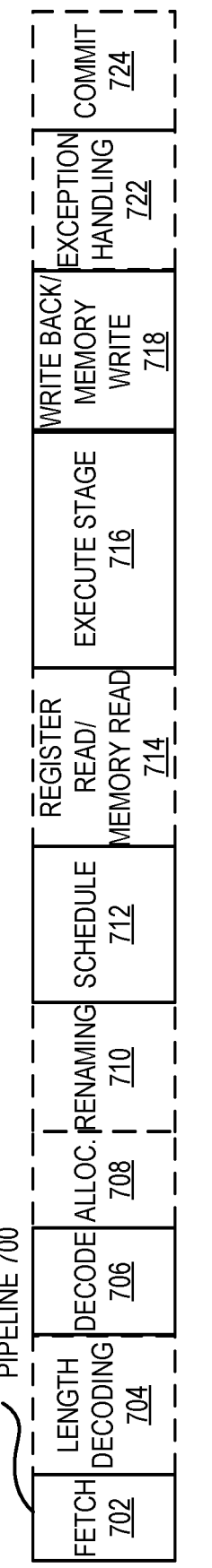
FIG. 7(A) is a block diagram illustrating both an example in-order pipeline and an example register renaming, out-of-order issue/execution pipeline according to examples.
Figure 7B:
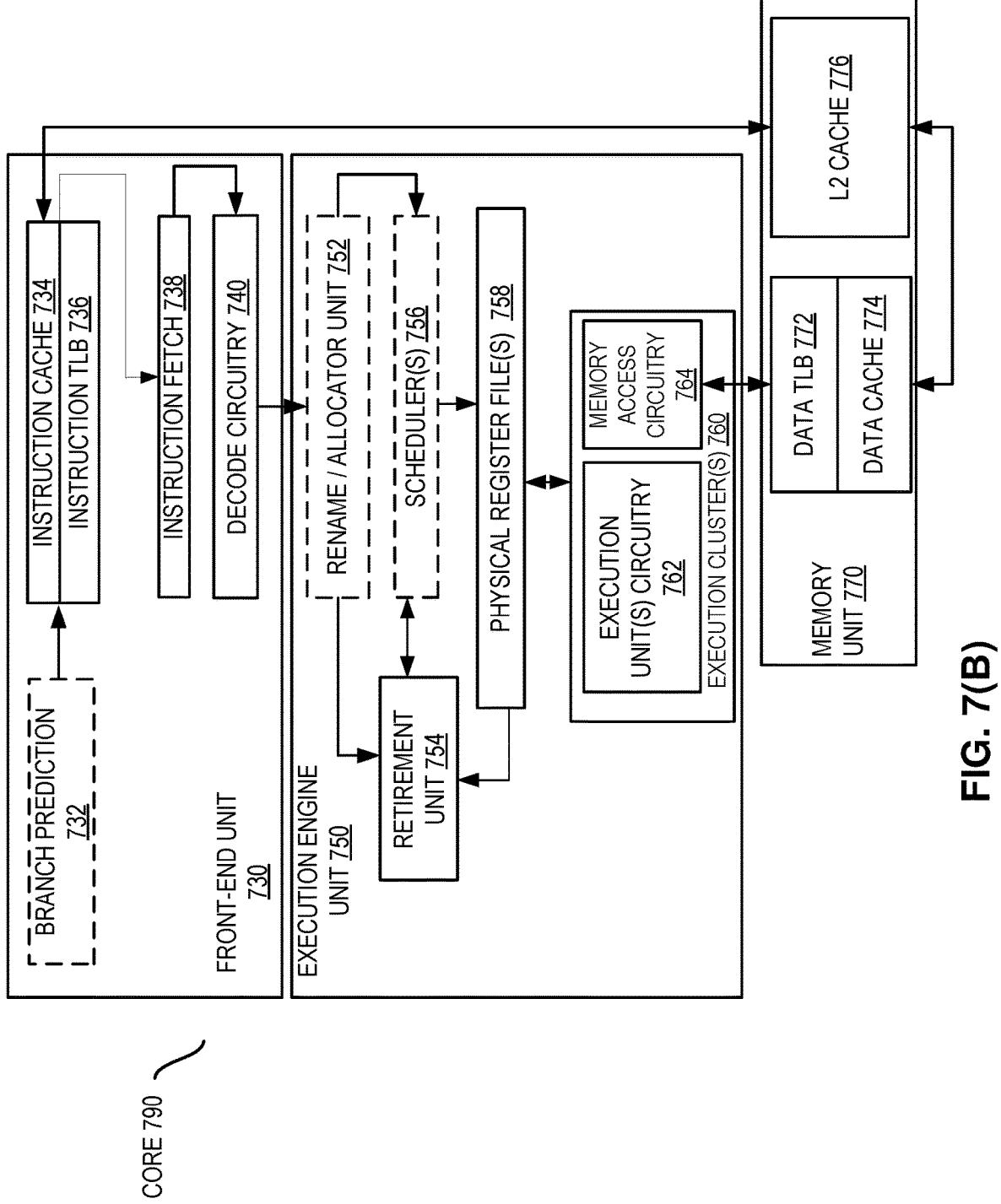
FIG. 7(B) is a block diagram illustrating both an example in-order architecture core and an example register renaming, out-of-order issue/execution architecture core to be included in a processor according to examples.

FIG. 7(A) is a block diagram illustrating both an example in-order pipeline and an example register renaming, out-of-order issue/execution pipeline according to examples. FIG. 7(B) is a block diagram illustrating both an example in-order architecture core and an example register renaming, out-of-order issue/execution architecture core to be included in a processor according to examples. The solid lined boxes in FIGS. 7(A)-(B) illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7(A), a processor pipeline 700 includes a fetch stage 702, an optional length decoding stage 704, a decode stage 706, an optional allocation (Alloc) stage 708, an optional renaming stage 710, a schedule (also known as a dispatch or issue) stage 712, an optional register read/memory read stage 714, an execute stage 716, a write back/memory write stage 718, an optional exception handling stage 722, and an optional commit stage 724. One or more operations can be performed in each of these processor pipeline stages. For example, during the fetch stage 702, one or more instructions are fetched from instruction memory, and during the decode stage 706, the one or more fetched instructions may be decoded, addresses (e.g., load store unit (LSU) addresses) using forwarded register ports may be generated, and branch forwarding (e.g., immediate offset or a link register (LR)) may be performed. In one example, the decode stage 706 and the register read/memory read stage 714 may be combined into one pipeline stage. In one example, during the execute stage 716, the decoded instructions may be executed, LSU address/data pipelining to an Advanced Microcontroller Bus (AMB) interface may be performed, multiply and add operations may be performed, arithmetic operations with branch results may be performed, etc.

By way of example, the example register renaming, out-of-order issue/execution architecture core of FIG. 7(B) may implement the pipeline 700 as follows: 1) the instruction fetch circuitry 738 performs the fetch and length decoding stages 702 and 704; 2) the decode circuitry 740 performs the decode stage 706; 3) the rename/allocator unit circuitry 752 performs the allocation stage 708 and renaming stage 710; 4) the scheduler(s) circuitry 756 performs the schedule stage 712; 5) the physical register file(s) circuitry 758 and the memory unit circuitry 770 perform the register read/memory read stage 714; the execution cluster(s) 760 perform the execute stage 716; 6) the memory unit circuitry 770 and the physical register file(s) circuitry 758 perform the write back/memory write stage 718; 7) various circuitry may be involved in the exception handling stage 722; and 8) the retirement unit circuitry 754 and the physical register file(s) circuitry 758 perform the commit stage 724.

FIG. 7(B) shows a processor core 790 including front-end unit circuitry 730 coupled to execution engine unit circuitry 750, and both are coupled to memory unit circuitry 770. The core 790 may be a reduced instruction set architecture computing (RISC) core, a complex instruction set architecture computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front-end unit circuitry 730 may include branch prediction circuitry 732 coupled to instruction cache circuitry 734, which is coupled to an instruction translation lookaside buffer (TLB) 736, which is coupled to instruction fetch circuitry 738, which is coupled to decode circuitry 740.

In one example, the instruction cache circuitry 734 is included in the memory unit circuitry 770 rather than the front-end circuitry 730. The decode circuitry 740 (or decoder) may decode instructions, and generate as an output one or more micro-operations, micro-code entry points, microinstructions, other instructions, or other control signals, which are decoded from, or which otherwise reflect, or are derived from, the original instructions. The decode circuitry 740 may further include address generation unit (AGU, not shown) circuitry. In one example, the AGU generates an LSU address using forwarded register ports, and may further perform branch forwarding (e.g., immediate offset branch forwarding, LR register branch forwarding, etc.). The decode circuitry 740 may be implemented using various different mechanisms. Examples of suitable mechanisms include, but are not limited to, look-up tables, hardware implementations, programmable logic arrays (PLAs), microcode read only memories (ROMs), etc. In one example, the core 790 includes a microcode ROM (not shown) or other medium that stores microcode for certain macroinstructions (e.g., in decode circuitry 740 or otherwise within the front-end circuitry 730). In one example, the decode circuitry 740 includes a micro-operation (micro-op) or operation cache (not shown) to hold/cache decoded operations, micro-tags, or micro-operations generated during the decode or other stages of the processor pipeline 700. The decode circuitry 740 may be coupled to rename/allocator unit circuitry 752 in the execution engine circuitry 750.

The execution engine circuitry 750 includes the rename/allocator unit circuitry 752 coupled to retirement unit circuitry 754 and a set of one or more scheduler(s) circuitry 756. The scheduler(s) circuitry 756 represents any number of different schedulers, including reservations stations, central instruction window, etc. In some examples, the scheduler(s) circuitry 756 can include arithmetic logic unit (ALU) scheduler/scheduling circuitry, ALU queues, address generation unit (AGU) scheduler/scheduling circuitry, AGU queues, etc. The scheduler(s) circuitry 756 is coupled to the physical register file(s) circuitry 758. Each of the physical register file(s) circuitry 758 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one example, the physical register file(s) circuitry 758 includes vector registers unit circuitry, writemask registers unit circuitry, and scalar register unit circuitry. These register units may provide architectural vector registers, vector mask registers, general-purpose registers, etc. The physical register file(s) circuitry 758 is coupled to the retirement unit circuitry 754 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 754 and the physical register file(s) circuitry 758 are coupled to the execution cluster(s) 760. The execution cluster(s) 760 includes a set of one or more execution unit(s) circuitry 762 and a set of one or more memory access circuitry 764. The execution unit(s) circuitry 762 may perform various arithmetic, logic, floating-point or other types of operations (e.g., shifts, addition, subtraction, multiplication) and on various types of data (e.g., scalar integer, scalar floating-point, packed integer, packed floating-point, vector integer, vector floating-point).

While some examples may include a number of execution units or execution unit circuitry dedicated to specific functions or sets of functions, other examples may include only one execution unit circuitry or multiple execution units/ execution unit circuitry that all perform all functions. The scheduler(s) circuitry 756, physical register file(s) circuitry 758, and execution cluster(s) 760 are shown as being possibly plural because certain examples create separate pipelines for certain types of data/operations (e.g., a scalar integer pipeline, a scalar floating-point/packed integer/ packed floating-point/vector integer/vector floating-point pipeline, and/or a memory access pipeline that each have their own scheduler circuitry, physical register file(s) circuitry, and/or execution cluster—and in the case of a separate memory access pipeline, certain examples are implemented in which only the execution cluster of this pipeline has the memory access unit(s) circuitry 764). It should also be understood that where separate pipelines are used, one or more of these pipelines may be out-of-order issue/execution and the rest in-order.

In some examples, the execution engine unit circuitry 750 may perform load store unit (LSU) address/data pipelining to an Advanced Microcontroller Bus (AMB) interface (not shown), and address phase and writeback, data phase load, store, and branches.

The set of memory access circuitry 764 is coupled to the memory unit circuitry 770, which includes data TLB circuitry 772 coupled to data cache circuitry 774 coupled to level 2 (L2) cache circuitry 776. In one example, the memory access circuitry 764 may include load unit circuitry, store address unit circuitry, and store data unit circuitry, each of which is coupled to the data TLB circuitry 772 in the memory unit circuitry 770. The instruction cache circuitry 734 is further coupled to the level 2 (L2) cache circuitry 776 in the memory unit circuitry 770. In one example, the instruction cache 734 and the data cache 774 are combined into a single instruction and data cache (not shown) in L2 cache circuitry 776, level 3 (L3) cache circuitry (not shown), and/or main memory. The L2 cache circuitry 776 is coupled to one or more other levels of cache and eventually to a main memory.

The core 790 may support one or more instructions sets (e.g., the x86 instruction set architecture (optionally with some extensions that have been added with newer versions); the MIPS instruction set architecture; the ARM instruction set architecture (optionally with optional additional extensions such as NEON)), including the instruction(s) described herein. In one example, the core 790 includes logic to support a packed data instruction set architecture extension (e.g., AVX1, AVX2), thereby allowing the operations used by many multimedia applications to be performed using packed data. In addition the core 790 may include DFX circuitry, including a TAP controller having a JTAG interface, at least portions of which may be gated by a replica TAP circuit as described herein.

Example Execution Unit(s) Circuitry

Figure 8:
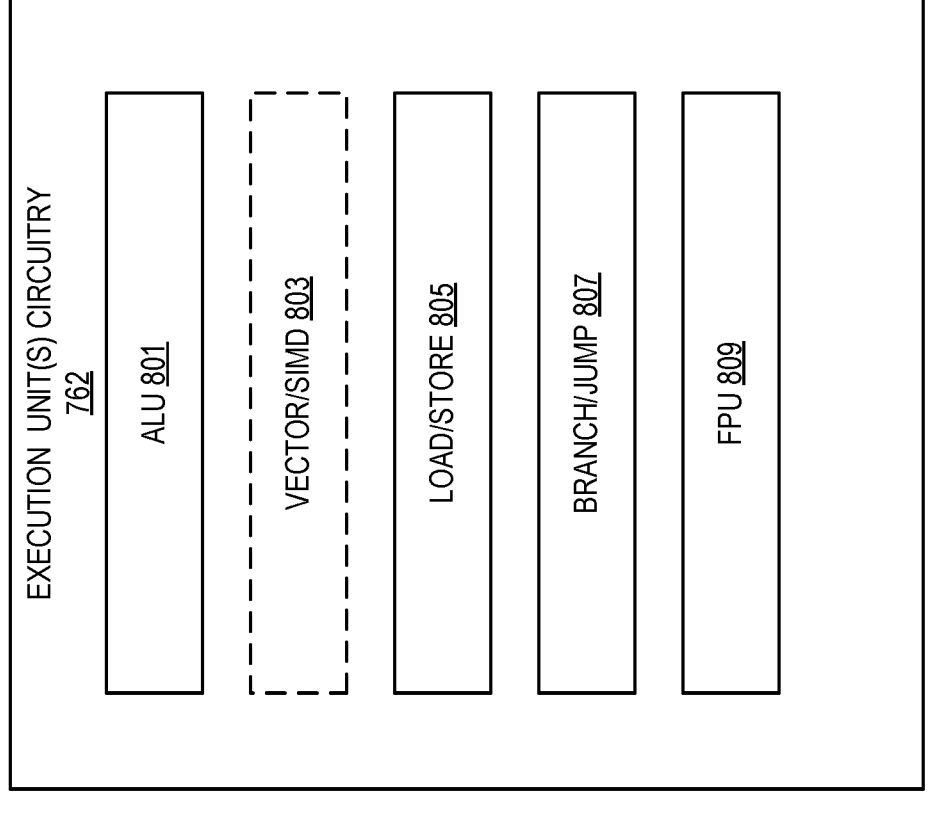
FIG. 8 illustrates examples of execution unit(s) circuitry.

FIG. 8 illustrates examples of execution unit(s) circuitry, such as execution unit(s) circuitry 762 of FIG. 7(B). As illustrated, execution unit(s) circuitry 762 may include one or more ALU circuits 801, optional vector/single instruction multiple data (SIMD) circuits 803, load/store circuits 805, branch/jump circuits 807, and/or Floating-point unit (FPU) circuits 809. ALU circuits 801 perform integer arithmetic and/or Boolean operations. Vector/SIMD circuits 803 perform vector/SIMD operations on packed data (such as SIMD/vector registers). Load/store circuits 805 execute load and store instructions to load data from memory into registers or store from registers to memory. Load/store circuits 805 may also generate addresses. Branch/jump circuits 807 cause a branch or jump to a memory address depending on the instruction. FPU circuits 809 perform floating-point arithmetic. The width of the execution unit(s) circuitry 762 varies depending upon the example and can range from 16-bit to 1,024-bit, for example. In some examples, two or more smaller execution units are logically combined to form a larger execution unit (e.g., two 128-bit execution units are logically combined to form a 256-bit execution unit).

Example Register Architecture

FIG. 9 is a block diagram of a register architecture 900 according to some examples. As illustrated, the register architecture 900 includes vector/SIMD registers 910 that vary from 128-bit to 1,024 bits width. In some examples, the vector/SIMD registers 910 are physically 512-bits and, depending upon the mapping, only some of the lower bits are used. For example, in some examples, the vector/SIMD registers 910 are ZMM registers which are 512 bits: the lower 256 bits are used for YMM registers and the lower 128 bits are used for XMM registers. As such, there is an overlay of registers. In some examples, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the example.

In some examples, the register architecture 900 includes writemask/predicate registers 915. For example, in some examples, there are 8 writemask/predicate registers (sometimes called k0 through k7) that are each 16-bit, 32-bit, 64-bit, or 128-bit in size. Writemask/predicate registers 915 may allow for merging (e.g., allowing any set of elements in the destination to be protected from updates during the execution of any operation) and/or zeroing (e.g., zeroing vector masks allow any set of elements in the destination to be zeroed during the execution of any operation). In some examples, each data element position in a given writemask/predicate register 915 corresponds to a data element position of the destination. In other examples, the writemask/predicate registers 915 are scalable and consists of a set number of enable bits for a given vector element (e.g., 8 enable bits per 64-bit vector element).

The register architecture 900 includes a plurality of general-purpose registers 925. These registers may be 16-bit, 32-bit, 64-bit, etc. and can be used for scalar operations. In some examples, these registers are referenced by the names RAX, RBX, RCX, RDX, RBP, RSI, RDI, RSP, and R8 through R15.

In some examples, the register architecture 900 includes scalar floating-point (FP) register file 945 which is used for scalar floating-point operations on 32/64/80-bit floating-point data using the x87 instruction set architecture extension or as MMX registers to perform operations on 64-bit packed integer data, as well as to hold operands for some operations performed between the MMX and XMM registers.

One or more flag registers 940 (e.g., EFLAGS, RFLAGS, etc.) store status and control information for arithmetic, compare, and system operations. For example, the one or more flag registers 940 may store condition code information such as carry, parity, auxiliary carry, zero, sign, and overflow. In some examples, the one or more flag registers 940 are called program status and control registers.

Segment registers 920 contain segment points for use in accessing memory. In some examples, these registers are referenced by the names CS, DS, SS, ES, FS, and GS.

Machine specific registers (MSRs) 935 control and report on processor performance. Most MSRs 935 handle system-related functions and are not accessible to an application program. Machine check registers 960 consist of control, status, and error reporting MSRs that are used to detect and report on hardware errors.

One or more instruction pointer register(s) 930 store an instruction pointer value. Control register(s) 955 (e.g., CR0-CR4) determine the operating mode of a processor (e.g., processor 570, 580, 538, 515, and/or 600) and the characteristics of a currently executing task. Debug registers 950 control and allow for the monitoring of a processor or core's debugging operations.

Memory (mem) management registers 965 specify the locations of data structures used in protected mode memory management. These registers may include a global descriptor table register (GDTR), interrupt descriptor table register (IDTR), task register, and a local descriptor table register (LDTR) register.

Figure 10:
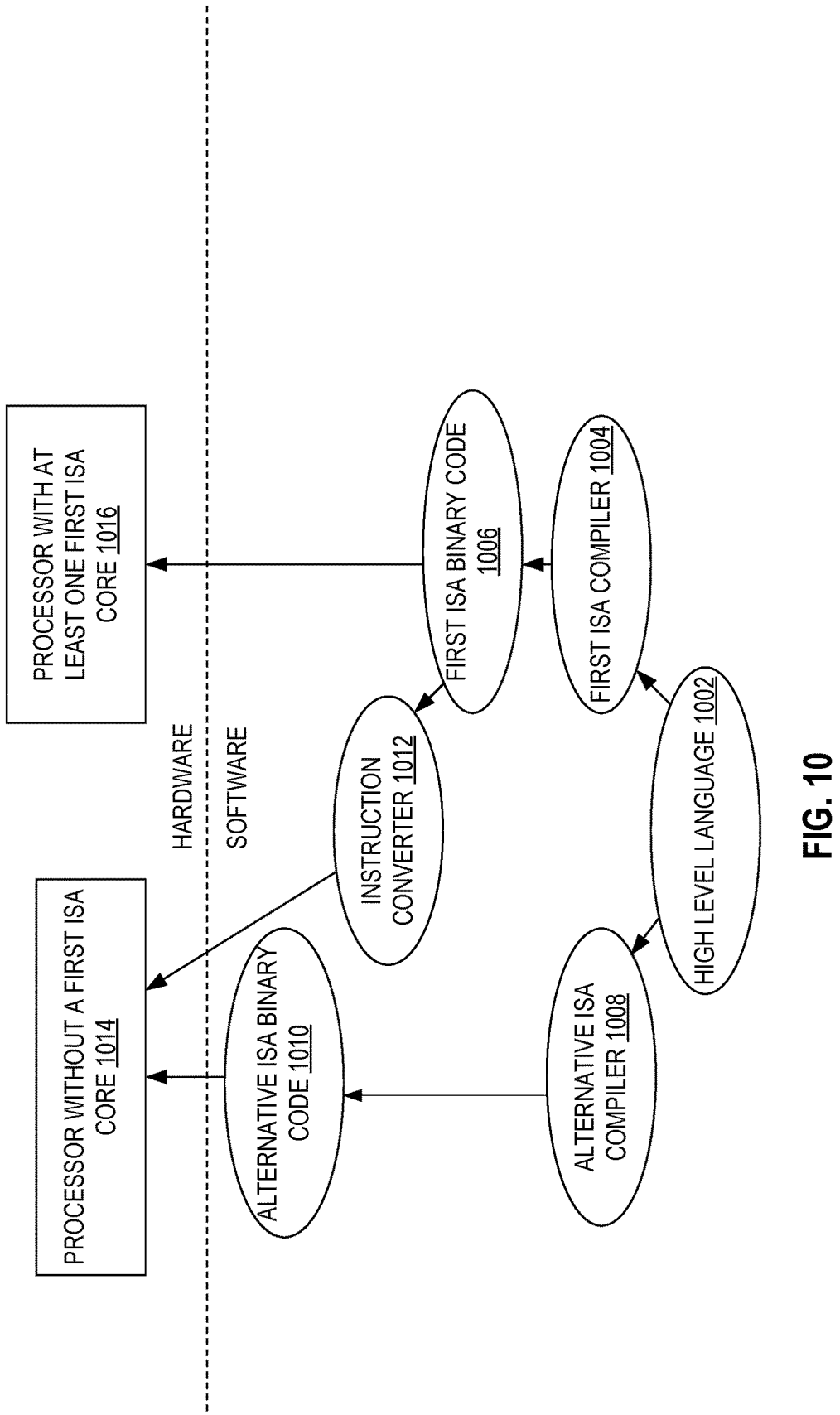
FIG. 10 is a block diagram illustrating the use of a software instruction converter to convert binary instructions in a source instruction set architecture to binary instructions in a target instruction set architecture according to examples.

FIG. 10 is a block diagram illustrating the use of a software instruction converter to convert binary instructions in a source ISA to binary instructions in a target ISA according to examples. In the illustrated example, the instruction converter is a software instruction converter, although alternatively the instruction converter may be implemented in software, firmware, hardware, or various combinations thereof. FIG. 10 shows a program in a high-level language 1002 may be compiled using a first ISA compiler 1004 to generate first ISA binary code 1006 that may be natively executed by a processor with at least one first ISA core 1016. The processor with at least one first ISA core 1016 represents any processor that can perform substantially the same functions as an Intel® processor with at least one first ISA core by compatibly executing or otherwise processing (1) a substantial portion of the first ISA or (2) object code versions of applications or other software targeted to run on an Intel processor with at least one first ISA core, in order to achieve substantially the same result as a processor with at least one first ISA core. The first ISA compiler 1004 represents a compiler that is operable to generate first ISA binary code 1006 (e.g., object code) that can, with or without additional linkage processing, be executed on the processor with at least one first ISA core 1016. Similarly, FIG. 10 shows the program in the high-level language 1002 may be compiled using an alternative ISA compiler 1008 to generate alternative ISA binary code 1010 that may be natively executed by a processor without a first ISA core 1014. The instruction converter 1012 is used to convert the first ISA binary code 1006 into code that may be natively executed by the processor without a first ISA core 1014. This converted code is not necessarily to be the same as the alternative ISA binary code 1010; however, the converted code will accomplish the general operation and be made up of instructions from the alternative ISA. Thus, the instruction converter 1012 represents software, firmware, hardware, or a combination thereof that, through emulation, simulation or any other process, allows a processor or other electronic device that does not have a first ISA processor or core to execute the first ISA binary code 1006.

The following examples pertain to further embodiments.

In one example, an apparatus comprises: an IP circuit comprises: a functional circuit to perform one or more functions; a TAP controller to receive and send test data; and a plurality of test data registers coupled to the TAP controller, the plurality of test data registers to store one or more test data; and a replica circuit coupled to the TAP controller, where the replica circuit is to receive a security policy and gate at least a portion of a test interface based at least in part on the security policy.

In an example, the replica circuit further comprises: a replica TAP controller; and a security circuit to receive the security policy and to gate access to at least one of the plurality of test data registers based at least in part on the security policy.

In an example, the replica circuit further comprises: gating circuitry coupled to the security circuit; and a decode circuit coupled to the replica TAP controller, where the decode circuit is to decode an access command to identify a first test data register to be accessed, where the gating circuitry is to gate access to the first test data register based at least in part on the security policy.

In an example, the gating circuitry comprises: a first plurality of logic gates to generate first output signals; a second plurality of logic gates to receive one or more of the first output signals and generate second output signals; and at least one third logic gate to receive the second output signals and generate a security gating signal to cause the access to at least the portion of the test interface to be gated.

In an example, the apparatus further comprises a security policy generator to provide the security policy to the security circuit, where the apparatus comprises a system on chip.

In an example, the apparatus further comprises: a second IP circuit comprising a second functional circuit, a second TAP controller, and a second plurality of test data registers; and a second replica circuit coupled to the second IP circuit, where the second replica circuit is to gate access to at least one of the second plurality of test data registers based at least in part on the security policy.

In an example, the replica TAP controller and the TAP controller are to receive test signal information in parallel, and based on the test signal information, the replica TAP controller and the TAP controller are to be in synchronization.

In an example, the IP circuit comprises a third party IP circuit, the third party IP circuit having a default security policy to control access to the plurality of test data registers, and where the replica circuit is to cause at least a portion of the default security policy to be overridden.

In an example, the replica circuit is to prevent access to a first test data register of the plurality of test data registers based at least in part on the security policy, where access to the first test data register is allowed according to the default security policy In an example, the replica circuit is transparent to an external access.

In another example, a method comprises: receiving, in a replica circuit associated with a first IP circuit of a SoC, a security policy; receiving, in the replica circuit, a test data register access message to identify an access to a first test data register of the first IP circuit; and preventing the access to the first test data register based at least in part on the security policy.

In an example, the method further comprises sending a gating signal from the replica circuit to a test interface of the first IP circuit to prevent the access.

In an example, preventing the access to the first test data register comprises overriding a default security policy of the first IP circuit, the default security policy to allow access to the first test data register.

In an example, the method further comprises maintaining a TAP controller of the first IP circuit in synchronization with a replica TAP controller of the replica circuit.

In an example, the method further comprises receiving, in parallel in the TAP controller and the replica TAP controller, a test mode signal and maintaining the TAP controller of the first IP circuit in synchronization with the replica TAP controller in response to the test mode signal.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In another example, a system on chip comprises: a first IP circuit comprising: a first functional circuit to perform one or more functions; a first TAP controller to receive and send test data; and first DFX circuitry associated with a first plurality of test data registers; first replica circuitry comprising a first replica TAP controller to operate in synchronization with the first TAP controller, the first replica circuitry to control access to one or more of the first plurality of test data registers in response to a security policy; and a security policy generator coupled to the first replica TAP circuitry, where the security policy generator is to generate the security policy.

In an example, the system on chip further comprises gating circuitry coupled to the first replica circuitry, where the gating circuitry is to gate test signaling from being provided to the first TAP controller based at least in part on a security gating signal from the first replica circuitry.

In an example, the first IP circuit comprises a third party IP circuit, the third party IP circuit having a default security policy to control access to the first plurality of test data registers, and the first replica circuit is to cause at least a portion of the default security policy to be overridden.

In an example, the first IP circuit further comprises a first security circuit to control access to the first plurality of test data registers according to a default security policy for the first IP circuit, where the first replica circuit is to cause at least a portion of the default security policy to be overridden.

In an example, the system on chip further comprises: a second IP circuit comprising a second functional circuit, a second TAP controller, second DFX circuitry associated with a second plurality of test data registers, and a security circuit to enforce access to the second plurality of test data registers according to a default security policy for the second IP circuit; and second replica circuitry comprising a second replica TAP controller to operate in synchronization with the second TAP controller, the second replica circuitry to override at least a portion of the default security policy for the second IP circuit based at least in part on the security policy.

In yet another example, an apparatus comprises: means for receiving a security policy for an SoC; means for receiving a test data register access message to identify an access to first test data register means of a first IP circuit means; and means for preventing the access to the first test data register means based at least in part on the security policy.

In an example, the apparatus further comprises means for sending a gating signal from replica means to test interface means of the first IP circuit means for preventing the access.

In an example, the apparatus further comprises means for overriding a default security policy of the first IP circuit means, the default security policy to allow access to the first test data register means.

In an example, the apparatus further comprises means for maintaining a TAP control means of the first IP circuit means in synchronization with a replica TAP control means of the replica means.

In an example, the apparatus further comprises means for receiving, in parallel in the TAP control means and the replica TAP control means, a test mode signal and means maintaining the TAP control means of the first IP circuit means in synchronization with the replica TAP control means in response to the test mode signal.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SOC or other processor, is to configure the SOC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. An apparatus comprising:
an intellectual property (IP) circuit comprising:
    a functional circuit to perform one or more functions;
    a test access port (TAP) controller to receive and send test data; and
    a plurality of test data registers coupled to the TAP controller, the plurality of test data registers to store one or more test data; and
a replica circuit configured to receive a security policy and gate at least a portion of a test interface based at least in part on the security policy, wherein the replica circuit comprises:
    a replica TAP controller; and
    a security circuit to receive the security policy and to gate access to at least one of the plurality of test data registers based at least in part on gating circuitry coupled to the security circuit; and
    a decode circuit coupled to the replica TAP controller, wherein the decode circuit is configured to decode an access command to identify a first test data register to be accessed, wherein the gating circuitry is configured to gate access to the first test data register based at least in part on the security policy.

2. The apparatus of claim 1, wherein the gating circuitry comprises:
a first plurality of logic gates to generate first output signals;
a second plurality of logic gates to receive one or more of the first output signals and generate second output signals; and
at least one third logic gate to receive the second output signals and generate a security gating signal to cause access to at least the portion of the test interface to be gated.

3. The apparatus of claim 1, further comprising a security policy generator to provide the security policy to the security circuit, wherein the apparatus comprises a system on chip.

4. The apparatus of claim 1, further comprising:
a second IP circuit comprising a second functional circuit, a second TAP controller, and a second plurality of test data registers; and
a second replica circuit coupled to the second IP circuit, wherein the second replica circuit is configured to gate access to at least one of the second plurality of test data registers based at least in part on the security policy.

5. The apparatus of claim 1, wherein the replica TAP controller and the TAP controller are to receive test signal information in parallel, and based on the test signal information, the replica TAP controller and the TAP controller are to be in synchronization.

6. The apparatus of claim 1, wherein the IP circuit comprises a third party IP circuit, the third party IP circuit having a default security policy to control access to the plurality of test data registers, and wherein the replica circuit is configured to cause at least a portion of the default security policy to be overridden.

7. The apparatus of claim 6, wherein the replica circuit is configured to prevent access to a first test data register of the plurality of test data registers based at least in part on the security policy, wherein access to the first test data register is allowed according to the default security policy.

8. The apparatus of claim 1, wherein the replica circuit is transparent to an external access.

9. A method comprising:

receiving, in a replica circuit associated with a first intellectual property (IP) circuit of a system on chip (SoC), a security policy;

receiving, in the replica circuit, a test data register access message to identify an access to a first test data register of the first IP circuit; and preventing the access to the first test data register based at least in part on the security policy, wherein the replica circuit comprises:

a replica TAP controller; and a security circuit to receive the security policy and to gate access to at least one of a plurality of test data registers based at least in part on gating circuitry coupled to the security circuit; and a decode circuit coupled to the replica TAP controller, wherein the decode circuit is configured to decode an access command to identify a first test data register to be accessed, wherein the gating circuitry is configured to gate access to the first test data register based at least in part on the security policy.

10. The method of claim 9, further comprising sending a gating signal from the replica circuit to a test interface of the first IP circuit to prevent the access.

11. The method of claim 9, wherein preventing the access to the first test data register comprises overriding a default security policy of the first IP circuit, the default security policy to allow access to the first test data register.

12. The method of claim 9, further comprising maintaining a test access port (TAP) controller of the first IP circuit in synchronization with a replica TAP controller of the replica circuit.

13. The method of claim 12, further comprising receiving, in parallel in the TAP controller and the replica TAP controller, a test mode signal and maintaining the TAP controller of the first IP circuit in synchronization with the replica TAP controller in response to the test mode signal.

14. A system on chip comprising:

a first intellectual property (IP) circuit comprising:

a first functional circuit to perform one or more functions;

a first test access port (TAP) controller to receive and send test data; and first design for test/debug (DFX) circuitry associated with a first plurality of test data registers;

first replica circuitry comprising a first replica TAP controller to operate in synchronization with the first TAP controller, the first replica circuitry to control access to one or more of the first plurality of test data registers in response to a security policy, wherein the first replica circuitry comprises:

a replica TAP controller; and a security circuit to receive the security policy and to gate access to at least one of the plurality of test data registers based at least in part on the security policy gating circuitry coupled to the security circuit; and a decode circuit coupled to the replica TAP controller, wherein the decode circuit is configured to decode an access command to identify a first test data register to be accessed, wherein the gating circuitry is configured to gate access to the first test data register based at least in part on the security policy; and a security policy generator coupled to the first replica TAP circuitry, wherein the security policy generator is configured to generate the security policy.

15. The system on chip of claim 14, further comprising gating circuitry coupled to the first replica circuitry, wherein the gating circuitry is configured to gate test signaling from being provided to the first TAP controller based at least in part on a security gating signal from the first replica circuitry.

16. The system on chip of claim 14, wherein the first IP circuit comprises a third party IP circuit, the third party IP circuit having a default security policy to control access to the first plurality of test data registers, and the first replica circuit is configured to cause at least a portion of the default security policy to be overridden.

17. The system on chip of claim 14, wherein the first IP circuit further comprises a first security circuit to control access to the first plurality of test data registers according to a default security policy for the first IP circuit, wherein the first replica circuit is configured to cause at least a portion of the default security policy to be overridden.

18. The system on chip of claim 14, further comprising:

a second IP circuit comprising a second functional circuit, a second TAP controller, second DFX circuitry associated with a second plurality of test data registers, and a security circuit to enforce access to the second plurality of test data registers according to a default security policy for the second IP circuit; and second replica circuitry comprising a second replica TAP controller to operate in synchronization with the second TAP controller, the second replica circuitry to override at least a portion of the default security policy for the second IP circuit based at least in part on the security policy.

\* \* \* \* \*